H. S. MILLS.
LENS HOLDER.
APPLICATION FILED OCT. 3, 1908.
930,210.
Patented Aug. 3, 1909.
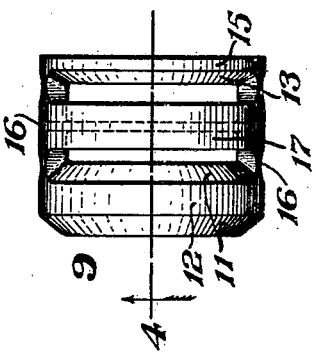
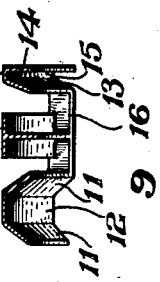
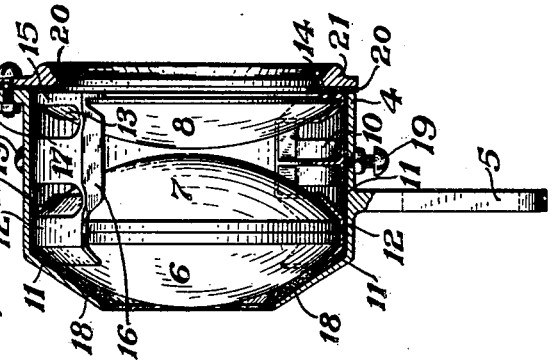
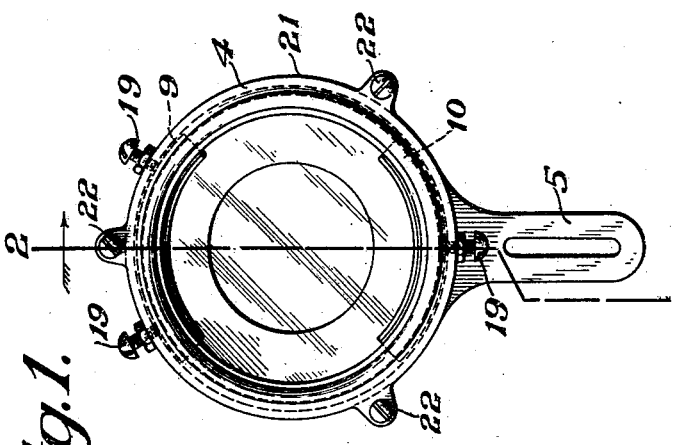
WITNESSES:
John F. Sandell,
Ralph A. Schaefer
INVENTOR:
HERBERT S. MILLS,
BY Dyrenforth, Lee, Chritton & Wiles,
ATTY'S.

UNITED STATES PATENT OFFICE.

HERBERT S. MILLS, OF CHICAGO, ILLINOIS.

LENS-HOLDER.

No. 930,210.     Specification of Letters Patent.     Patented Aug. 3, 1909.

Application filed October 3, 1908. Serial No. 456,054.

*To all whom it may concern:*

Be it known that I, HERBERT S. MILLS, a citizen of the United States, residing at Chicago, in the county of Cook and State of Illinois, have invented a new and useful Improvement in Lens-Holders, of which the following is a specification.

My invention relates to an improved construction of lens-holder, which I have more particularly devised for the condensing lenses in a moving-picture machine to render the holder dust-proof, to facilitate the assembling in the holder of the lenses in their proper relative positions, and to insure maintenance of the lenses in those positions.

In the accompanying drawing, Figure 1 shows my improved device by a view in end elevation; Fig. 2 is a section on line 2, Fig. 1; Fig. 3 is a plan view of one of the two similar lens-clamps, and Fig. 4 is a section on line 4, Fig. 3.

The holder 4 is a cylindrical open-ended barrel having a slotted stem 5 depending from it through which to secure it adjustably, as through the medium of a set-screw (not shown), to any suitable support, the forward end of the barrel tapering, as represented, to the opening therein. Three condensing lenses are confined in the barrel, the two forward ones, 6 and 7, fitting together convex sides turned outwardly and the rear lens 8 being held with its convex side in proper relation to that of the lens 7 by securing the several lenses between two arc-shaped clamps 9 and 10, both of the same construction, fitting about upper and lower arc-shaped sections of the inner wall of the barrel. Each clamp, which is preferably an integral casting, consists of an arc-shaped member having two similar slanting sides 11, 11 connected by a flat crown 12, to conform to the edge portion of the pair of lenses 6, 7, and an arc-shaped member having a slanting inner side 13 and a straight outer side 14 connected by a flat crown 15, to conform to the edge-portion of the lens 8, these members being united by end-connections 16 between which extends a web 17 of T-shape in cross-section. The lenses 6 and 7 and the lens 8, confined between the two clamps 9 and 10, respectively, in the forward double and rear single seats formed by their forward and rear members, are introduced into the barrel from its rear end against a dust-ring 18, preferably of felt, about the opening in its forward end, whereby this dust-ring is clamped in place against the lens 6, the clamps being secured in the barrel by set-screws 19 working through its wall against the webs 17, whereby the clamps are tightened against the lenses to confine them with proper rigidity. A dust-ring 20, also preferably of felt, is clamped between a ring 21 and the rear end of the barrel against the sides 14 of the lens-clamping members and about the rear face of the lens 8, the ring 21 being fastened in place by bolts 22 passed through ears extending from it and coinciding with similar ears on the barrel.

What I claim as new, and desire to secure by Letters Patent, is—

1. In combination, a lens-barrel, arc-shaped clamps removably secured in the barrel and forming between them forward and rear lens-confining seats, and lenses confined in said seats between the clamps.

2. In combination, a lens-barrel, arc-shaped clamps removably secured in the barrel and forming between them a forward double lens-seat and a rear single lens-seat, a pair of lenses confined in said forward seat and a single lens confined in said rear seat.

3. In combination, a lens-barrel having a tapering forward end, arc-shaped clamps removably secured in the barrel and forming between them forward and rear lens-confining seats, lenses confined in said seats between the clamps, a dust-ring confined between said clamps and the forward barrel-end against the foremost lens, and a dust-ring confined against the rearmost lens.

4. In combination, a lens-barrel, clamps in the barrel each comprising connected forward and rear arc-shaped members with an interposed web, lenses confined between the clamps in the seats formed, respectively, by their opposite forward and opposite rear members, and set-screws working in the barrel against said webs.

5. In combination, a lens-barrel, clamps in the barrel each comprising forward and rear arc-shaped members having end-connections with a web extending between them of T-shape in cross-section, lenses confined between the clamps in the seats formed, respectively, by their opposite forward and opposite rear members, and set-screws working in the barrel against said webs.

6. In combination, a lens-barrel having a tapering forward end, clamps in the barrel each comprising forward and rear arc-shaped members having end-connections with a web extending between them, lenses confined between the clamps in the seats formed, respectively, by their opposite forward and opposite rear members, a dust-ring confined between said clamps and forward barrel-end against the foremost lens, a rear dust-ring with a clamping ring securing it to the adjacent barrel-end against the rear clamp-members and lens confined therein, and set-screws working in the barrel against said webs.

HERBERT S. MILLS.

In presence of—
K. M. CORNWALL,
R. A. SCHAEFER.